Patented Aug. 7, 1934

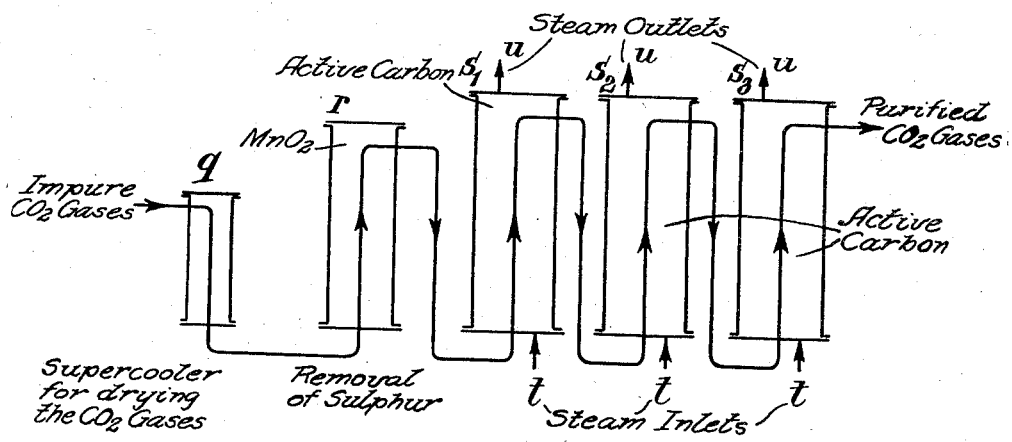

1,968,899

UNITED STATES PATENT OFFICE 1,968,899

PROCESS FOR THE PURIFICATION OF CARBONIC ACID GAS PRODUCED BY FERMENTATION AND OTHER PROCESSES

Leopold Nathan, Zurich, Switzerland, assignor to Hansena A.-G., Glarus, Switzerland, a corporation Application August 8, 1931, Serial No. 555,922
In Germany November 29, 1930

3 Claims. (Cl. 23—150)

In the purification of carbon dioxide gas, produced by fermentation processes, especially in the brewing industry, by freeing it from immature odoriferous constituents, according the U. S. Patent No. 1,268,872, it has been found that the effect of the purifying agents employed decreases, necessitating frequent replenishing thereof. The present invention remedies this defect, and, at the same time, provides a simpler, cheaper and more reliable process of purification, with, in addition, a higher degree of purity of the carbon dioxide.

The present process is based on the employment of active carbon, which possesses a high adsorptive capacity, especially for immature odoriferous constituents.

In the adaptation of the known purification process employing active carbon, it was found, in the first place, that the active carbon is exhausted after a certain time, and must then be regenerated or replaced by fresh carbon, and that this exhaustion is caused by the small amount of sulphur (appearing as sulphuretted hydrogen) contained in carbon dioxide produced by fermentation. To remedy this the sulphur must first be eliminated completely. The carbon dioxide gas (hereinafter abbreviated to $CO_2$) produced in the fermentation of beer by yeast, contains sulphuretted hydrogen in addition to alcohol and various other organic compounds, e. g. immature odoriferous constituents, which still await closer identification. This sulphuretted hydrogen tends to combine with the alcohol to form malodorous compounds, such as mercaptans, or thio-ethers. It has been ascertained that a suitable method of eliminating the injurious sulphur consists in converting it into the less re-active form of elementary sulphur, by oxidizing the sulphuretted hydrogen (for example with manganese dioxide), or by combining it with a metal to form a sulphide. Suitable agents for this latter purpose comprise porous substances, such as pumice, wadding or the like, charged with metallic oxides or hydroxides. Equally suitable is gypsum, stirred up with an aqueous suspension of metallic hydroxides, such as ferric hydroxide, and then, after setting and partial drying, crushed to a suitable degree. Burnt lime may also be used. It is found, however, that the moisture contained in the $CO_2$ is prejudicial to these reactions and soon restricts the action of the sulphur eliminators, such as manganese dioxide, and therefore in accordance with the present invention, the carbon dioxide gas is dried, by supercooling to nearly 0° C. before passing to the receptacle containing the manganese dioxide. After the dried $CO_2$ has been freed from sulphur, it is passed, in a known manner, through vessels charged with a suitable active carbon.

In view of the large quantities of $CO_2$ which have, usually, to be treated in breweries, and of the corresponding amounts of active carbon, the regeneration of the latter plays an important part in the fermentation processes. It is known to regenerate such carbon by means of steam, in cases where its accumulated impurities (a) can be volatilized by that means, or (b) distil over at steam temperature or (c) are carried off in the condensed steam, and it has been ascertained that the impurities taken up from $CO_2$ produced by fermentation can be eliminated completely in this manner. A further disadvantage, however, has been encountered in such regeneration, namely that the carbon becomes laden with moisture and is then no longer active, or its adsorptive capacity is impaired in proportion to the moisture present. It has been found that, in operating with wet steam, the carbon absorbs its own weight of water, so that an expensive drying process is necessary before it can be used again. Moreover, the carbon itself suffers through the protracted presence of water, and therefore, according to a further feature of the invention, hot gases are employed for the regeneration of the active carbon, preferably superheated steam, (this being the cheapest hot gas procurable) superheated to about 300° C. In such a case, the water of condensation formed at the beginning of the regeneration is soon removed during the further course of the operation, particularly when insulated vessels are used.

A suitable apparatus for carrying out the process comprises a supercooler, a receptacle for the manganese dioxide, and preferably a plurality of vessels containing carbon, through which the $CO_2$ is passed in succession, and which can be disconnected individually for the purpose of regeneration. In all cases, the last carbon-containing vessels of the series contain the most active carbon. The manganese dioxide requires renewal at long intervals only, so that a single receptacle for this material is sufficient. It has been ascertained that the manganese dioxide ($MnO_2$) not only absorbs the sulphur, but that adsorption also occurs, and that the activity of such manganese dioxide is quickly impaired by these adherent impurities. It has been found advisable, therefore, to expel the adherent substances from the manganese dioxide by a blast of suitably superheated steam. The entire apparatus is connected with the brewing plant in such a manner that the $CO_2$ produced by fermentation passes into the usual gasholder under a slight positive pressure, i. e. a fraction of 1 atmosphere above atmospheric pressure, and, after purification, reaches the storage receptacle at a pressure of about 2.5 atmospheres. For this reason the $CO_2$ is subjected to corresponding pressure before entering the purification apparatus, and the purification is effected under that pressure. The gas may, however, be compressed only just before it reaches the carbon vessels.

A suitable apparatus is represented in the accompanying drawing, and will enable about 15.8 cubic metres of $CO_2$ to be purified per hour. The dimensions of the vessels are adapted to the capacity of the brewery or like establishment. The $CO_2$ enters the supercooler $q$, passes thence to the manganese dioxide receptacle $r$, and then through the carbon vessels $s_1$, $s_2$, $s_3$, preferably from below and passing upwardly. For breweries or like establishments of medium size, the capacity of the vessels would be 2.5 hectolitres.

According to one method of carrying out the process the cooler $q$ is a surface-cooler or condenser of known type fitted with cooling coils or the like, which should be so arranged and controlled as to prevent the temperature from becoming sufficiently low to permit the formation of ice. The manganese dioxide receptacle $r$ has a capacity of about 2.5 hectolitres with a charge of 500 kg. of manganese dioxide. The direction of $CO_2$ flow in this receptacle also is preferably from below and passing upwardly. The carbon vessels $s_1$, $s_2$, $s_3$ accommodate about 80 kg. of any suitable commercial active carbon. The period of service of a vessel depends on the fluctuating sulphuretted hydrogen content of the gases produced by fermentation and the quality of the manganese dioxide employed, the average volume of gas capable of purification with the above mentioned charge being about 25000 cubic metres. After that amount of purification has been effected, the first carbon vessel is disconnected, the purification being continued in the meantime by the remaining two vessels. Steam is blown into such disconnected vessel, through the pipe $t$, indicated by the arrow until all the odoriferous substances have been expelled, the steam and gasified impurities escaping into the open air through pipe indicated by the arrow $u$. The blowing of steam (preferably superheated to 300° C.) regenerates the carbon which, for the reasons explained above, has been impaired in its efficiency.

It will be evident that the process can be applied to the purification of carbon dioxide gas produced from sources other than the fermentation of beer, provided the impurities and moisture content are of the same order as those obtained during fermentation or otherwise in the production of beer. For instance, the sulphur content of the $CO_2$ may be due, in particular, to the sulphuretting of the hops or malt.

What I claim is:

1. The hereindescribed process which consists in subjecting impure moist carbon dioxide gases containing sulphur compounds and immature odoriferous constituents, to a vigorous cooling action for drying such gases, then bringing the dried gases into contact with an agent removing such sulphur compounds, and subsequently bringing the dry partly purified gases into contact with active carbon for the removal of the immature odoriferous constituents.

2. The hereindescribed process which consists in subjecting impure moist carbon dioxide gases containing hydrogen sulphide and immature odoriferous constituents, to a vigorous cooling action for drying such gases, then bringing the dried gases into contact with an agent which will oxidize the hydrogen sulphide and remove the product of said oxidation, and subsequently bringing the dry partly purified gases into contact with active carbon for the removal of the immature odoriferous constituents.

3. The hereindescribed process which consists in subjecting impure moist carbon dioxide gases containing sulphur compounds and immature odoriferous constituents, to a drying action, then bringing the dried gases into contact with an agent removing such sulphur compounds, and subsequently bringing the dry partly purified gases into contact with active carbon for the removal of the immature odoriferous constituents.

LEOPOLD NATHAN.